US012109668B2

(12) United States Patent
Tate et al.

(10) Patent No.: US 12,109,668 B2
(45) Date of Patent: Oct. 8, 2024

(54) BLIND CUTTING METHOD USING A HIGH-PRESSURE JET FOR AN ENGINE BODY

(71) Applicant: ARIANEGROUP SAS, Les Mureaux (FR)

(72) Inventors: Gregory Tate, Le Haillan (FR); Guillaume Tiffon, Le Haillan (FR); François Cenac, Montarbe (FR)

(73) Assignee: ARIANEGROUP SAS, Les Mureaux (FR)

( * ) Notice: Subject to any disclaimer, the term of this patent is extended or adjusted under 35 U.S.C. 154(b) by 0 days.

(21) Appl. No.: 18/563,171

(22) PCT Filed: Apr. 14, 2022

(86) PCT No.: PCT/FR2022/050703

§ 371 (c)(1),
(2) Date: Nov. 21, 2023

(87) PCT Pub. No.: WO2022/254105

PCT Pub. Date: Dec. 8, 2022

(65) Prior Publication Data

US 2024/0261934 A1 Aug. 8, 2024

(30) Foreign Application Priority Data

May 31, 2021 (FR) ....................................... 2105648

(51) Int. Cl.
*B24C 1/04* (2006.01)
*B26F 3/00* (2006.01)

(52) U.S. Cl.
CPC .............. *B24C 1/045* (2013.01); *B26F 3/004* (2013.01)

(58) Field of Classification Search
CPC ....... B24C 1/045; B24C 7/0007; B26F 3/004; B26F 1/26; F42B 33/008; Y10T 83/0591
See application file for complete search history.

(56) References Cited

U.S. PATENT DOCUMENTS 5,941,466 A * 8/1999 Alba ..................... F42B 33/008 241/1
2008/0006142 A1 1/2008 Goetsch et al.
(Continued)

FOREIGN PATENT DOCUMENTS

WO 2018087701 A1 5/2018

OTHER PUBLICATIONS

Hashish Med—Wood PA. "Turning. Milling. and Drilling With Abrasive-W Aterjets" Proceedings of the International Symposium on Jet Cuiting Technology. Sendai, Oct. 4-6, 1988; {Proceedings of the International Symposium on Jet Cuti/Ng Technology], Cranfield, BHRA, GB, vol. SYMP. 9. Oct. 4, 1988 (Oct. 4, 1988). pp. 113-131 XP000139955.
(Continued)

*Primary Examiner* — Joel D Crandall
(74) *Attorney, Agent, or Firm* — Bookoff McAndrews, PLLC

(57) ABSTRACT

A method for cutting, in a non-through manner, a body of a thruster of an aerospace vehicle, water jets, the method including a plurality of passes of a high-pressure water jet along the same cutting path extending across the external perimeter of the thruster body, the cutting path describing a closed loop circuit, and each water jet pass starting from a starting point located on the cutting path and stopping just after returning on the starting location. The starting point of each high-pressure water jet pass is different from the starting points of the other water jet passes.

6 Claims, 1 Drawing Sheet

(56) References Cited

U.S. PATENT DOCUMENTS

| | | | | |
|---|---|---|---|---|
| 2009/0272245 | A1 | 11/2009 | Voice et al. | |
| 2012/0227558 | A1* | 9/2012 | Goetsch | B24C 1/045 83/167 |
| 2015/0205296 | A1* | 7/2015 | Henning | G05B 19/4145 700/160 |

OTHER PUBLICATIONS

Search Report and Written Opinion issued in International Application No. PCT/FR2022/050703, mailed Jul. 21, 2022.

Search Report issued in French Application No. 2105648, mailed on Jan. 28, 2022.

* cited by examiner

[Fig. 1]
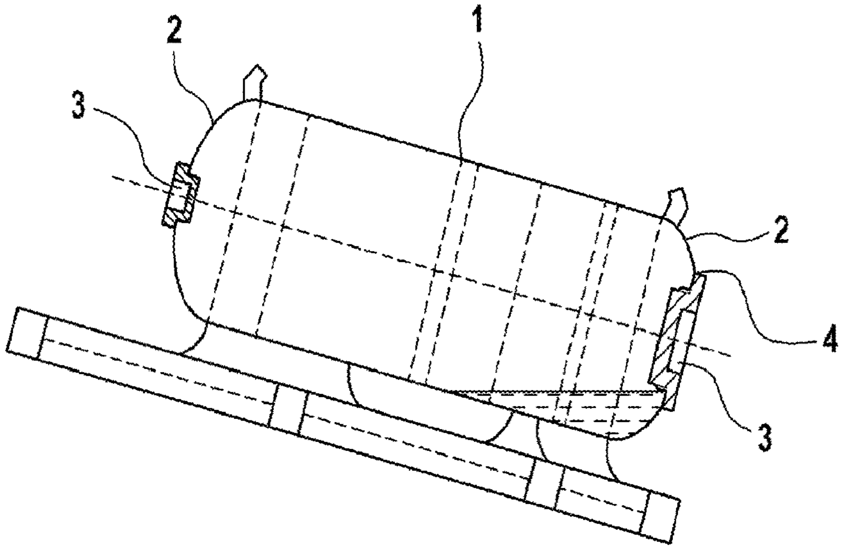
[Fig. 2]
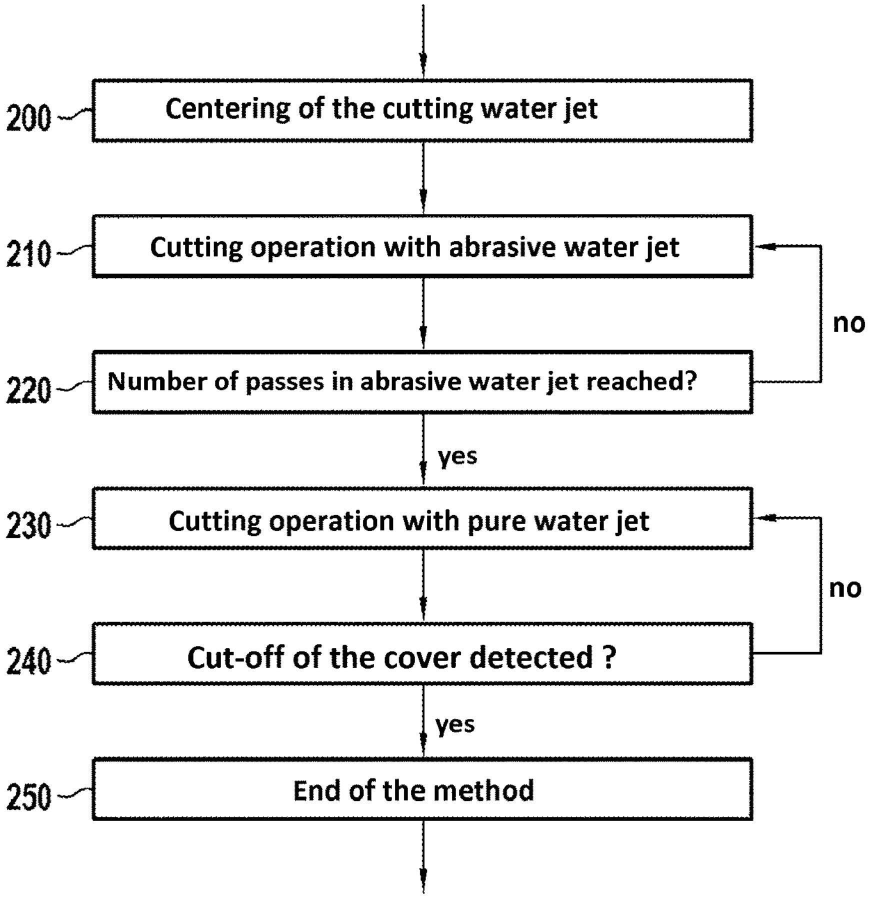

BLIND CUTTING METHOD USING A HIGH-PRESSURE JET FOR AN ENGINE BODY

CROSS-REFERENCE TO RELATED APPLICATIONS

This is a National Stage Application under 35 U.S.C. § 371 of International Application No. PCT/FR2022/050703, filed Apr. 14, 2022, now published as WO 2022/254105 A1, which claims priority to French Patent Application No. 2105648, filed on May 31, 2022, the entireties of which are incorporated herein by reference.

TECHNICAL FIELD

The invention relates to the thrusters of an aerospace transport vehicle, and more particularly to a method for cutting a thruster body using a high-pressure jet, the cutting being carried out in a non-through manner.

PRIOR ART

As illustrated in FIG. 1 which presents a schematic sectional view of a known thruster body 1, the body has the general shape of a cylinder closed at each axial end by a convex cover 2. Each cover 2 includes a plug 3. The plug is inserted into an opening provided in the cover and delimited by a shoulder 4 over its entire circumference, the shoulder protruding axially towards the inside of the thruster body.

Thus, the geometry of the thruster bodies used as illustrated in FIG. 1 is not adapted to the draining means used currently. Indeed, the presence of the recessed bottoms formed by the annular shoulder 4 can, on the one hand, generate a puddle which will alter the quality of the draining operation and, on the other hand, hinder the discharge of residual propellants coming from the draining operation.

These two problems require either vertical draining, which can be very complex for large loads, or draining of large loads rotating on a highly inclined plane with a residue suction device. These two solutions are very complex to implement.

In order to overcome these two problems, envisaged solution can be to remove the rear bottom of the loads before draining in order to eliminate the recessed bottoms. Thus the draining operation of these loads will be simplified thanks to the lack of rotation of the loads, and to the presence of a slight inclination (around 20°) of the load during the draining operation.

Opening the rear bottom can be carried out by high-pressure water jet cutting. However, the cut must not alter the propellant contained in the thruster.

If the cutting by abrasive water jet is very widespread throughout the world, the non-through machining or the non-through cutting are not well-known scientifically and almost non-existent industrially.

Some methods for cutting in a non-through manner in one or several passages are already known, these known methods attempting to reduce the depth variability of the non-through cutting by multiplying these passages.

However, the known methods deal with the continuous and non-continuous cutting of the transition areas. Indeed, to make a complete cut, the jet must return to where it has already cut to close the cut. By returning on an existing cutting line, the depth obtained locally is doubled. This singularity is not acceptable because there is a risk of reaching the propellant contained inside the thruster.

Furthermore, the known methods only deal with non-through cutting using abrasive water jet, which has the disadvantage of presenting a high pollution potential of the materials to be treated.

DISCLOSURE OF THE INVENTION

The main bijective of the present invention is therefore to propose a solution making it possible to cut only the body of a thruster of an aerospace vehicle, without altering the propellant contained inside the thruster to simplify the method for draining, i.e. emptying, a known thruster.

A first aspect of the invention proposes a method for cutting in a non-through manner a body of a thruster of an aerospace vehicle, using water jets, the method comprising a plurality of passes of a high-pressure water jet along the same cutting path extending across the external perimeter of the thruster body, the cutting path describing a closed loop circuit, and each water jet pass starting from a starting point located on the cutting path and stopping just after returning on the starting location.

According to a general feature of the invention, the starting point of each high-pressure water jet pass is different from the starting points of the other water jet passes.

Cutting by high-pressure water jet technique allows having a clean cutting quality (without delamination of the composite) without any significant heating unlike mechanical cutting, for example.

Furthermore, cutting by water jets in several passes according to the invention, that is to say by shifting, at every new pass, the starting point of the cutting path, makes it possible to manage the transition phases more easily, in other words the phase of the cutting pass during which the water jet returns to its starting point and therefore generates a deeper cut than on the rest of the path for this same pass.

Indeed, to make a complete cut, the jet must return to where it has already cut in order to close the cut. By returning to an existing cutting line, the depth obtained locally is doubled compared to the rest of the path of this same cutting pass.

The water jet cutting method according to the invention thus makes it possible to carry out cutting in a plurality of passes or passages by shifting, at each pass, the singularity due to the closure of the path.

According to a first aspect of the non-through cutting method, at least the first high-pressure water jet pass can use an abrasive water jet.

The thruster bodies are generally composed of a stack of several different materials: some cork in the external portion forming an external thermal protection (PTE), then a structure made of composite material, then an internal thermal protection made of elastomer (PTI and detached skin). The body of the thruster includes propellant thereinside.

The use of an abrasive water jet at the beginning of the cutting method, that is to say for the first pass(es) of the high-pressure water jet, makes it possible to begin the cutting cleanly, in particular in order to cut the layer made of composite material which is generally harder than other layers. For such hard layers, the use of an abrasive water jet makes it possible to carry out a cutting without creating delamination or loosening of fiber.

According to a second aspect of the non-through cutting method, at least the last pass of the high-pressure water jet can use a pure water jet.

Using a pure water jet for the last pass(es) makes it possible to reduce the risks of pollution in the materials to be treated.

Pure water jet can be used after several passes with an abrasive water jet, in particular after the layers of hard material, such as composite materials, have been cut. The pure water jet can be used in particular to cut an elastomer layer without risk of water pollution.

According to a third aspect of the non-through cutting method, the method can further include, at each pass of a water jet, a step of detecting the end of cutting to control the cutting depth at any time and avoid altering the material contained in the thruster.

According to a fourth aspect of the non-through cutting method, the step of detecting the end of cutting can include the application of a pulling force on a portion of the thruster body located on one side of the cutting path and, if said pulled portion is moved relative to the other portion, include an indication of the end of cutting.

The method thus includes a step of tensioning the cut area during each pass or between the passes, in particular the last passes, to evaluate directly how many passes are sufficient.

Furthermore, as the method according to the invention combines shifting the starting point of each cutting pass, using an abrasive water jet for said at least one first pass and using a pure water jet for said at least one last pass, and a detection of the end of cutting, it is possible to maximize the safety and efficiency of the method for cutting a thruster body making it possible to avoid altering the content of the thruster body.

According to a fifth aspect of the non-through cutting method, the thruster body to be cut can have the shape of a cylinder closed at both its axial ends by covers curved outwardly, the body comprising a multilayer wall including a stack, from outside to inside, of an external thermal protection layer, of a layer made of composite material and of an internal thermal protection layer, and the convex covers further having an elastomer skin intended to be in contact of the fuel contained in the body and separated from the internal thermal protection layer by a space, and the non-through cutting method can include a step of centering the cutting path on a convex cover, the cutting being carried out until the space separating the elastomer skin and the internal thermal protection layer is reached.

To prevent the content of the thruster, generally the propellant, from being altered, the cut must be a non-through cut. And for the cut to be sufficient to remove the cover and allow access to the propellant without the risk of altering the propellant, the cut stops in the gap, that is to say in the space existing between the elastomer skin and the inner protective layer which is generally also made of elastomer.

The method according to the invention thus provides a solution making it possible to cut only the external thermal protection (PTE), the composite structure and the internal thermal protection (PTI) of a thruster body of an aerospace vehicle, without altering the propellant content inside the thruster.

BRIEF DESCRIPTION OF THE DRAWINGS

Other characteristics and advantages of the present invention will emerge from the description given below, with reference to the appended drawings which illustrate an exemplary embodiment devoid of any limitation.

FIG. 1, already presented, schematically presents a sectional view of a known thruster.

FIG. 2 presents a flowchart of a method for cutting in a non-through manner a thruster body according to one mode of implementation of the invention.

DESCRIPTION OF THE EMBODIMENTS

FIG. 2 presents a flowchart of a method for cutting, in a non-through manner, using water jets, a thruster body of an aerospace vehicle according to one mode of implementation of the invention.

The thruster body of the aerospace vehicle to be cut may have the shape of a cylinder closed at both of its axial ends by covers curved outwardly. The body comprises a multilayer wall including a stack, from the outside of the body to the inside of the body, of an external thermal protection layer, of a layer made of composite material and of an internal thermal protection layer. The convex covers further have an elastomer skin intended to be in contact with the fuel contained in the body and separated from the internal thermal protection layer by a space.

To prevent the content of the thruster, generally the propellant, from being altered, the cut must be a non-through cut. And for the cut to be sufficient to remove the cover and allow access to the propellant without the risk of altering the propellant, it is preferable that the cut stops in the gap that is to say in the space existing between the elastomer skin and the internal protective layer which is also generally made of elastomer.

For this, the method according to the invention includes, first of all, a first step 200 of centering the cutting path on a convex cover in which the cutting water projection system is centered facing the starting point of the cut-out of the thruster body to be cut.

In a second step 210, the method includes a pass of a first cutting operation, the first cutting operation being carried out using an abrasive water jet, and the pass being made over the entire outer circular perimeter of the cylindrical body.

The use of an abrasive water jet at the beginning of the cutting method, that is to say for the first pass(es) of the high-pressure water jet, makes it possible to start the cutting operation properly, in particular to cut the layer made of composite material which is generally harder than other layers. For such hard layers, the use of an abrasive water jet makes it possible to carry out a cutting without creating delamination or loosening of fiber.

At the end of the pass, the method includes a third step 220 in which the number of passes of the first cutting operation carried out, that is to say the cutting operation using abrasive water jet, is compared to a threshold of passes of the first cutting operation.

If the number of passes carried out is below the threshold, the second and third steps 210 and 220 are repeated. When the number of passes carried out is equal to the threshold, the method carries out, in a fourth step 230, a pass of a second cutting operation using a pure water jet. The use of a pure water jet for the last passes allows reducing the risk of pollution of the materials to be treated.

The pure water jet can be used after several passes with an abrasive water jet, in particular after the hard material layers, such as the composite materials, have been cut. The pure water jet can be used in particular to cut an elastomer layer without risking water pollution.

Each pass of the first cutting operation or second cutting operation is carried out over the entire circular perimeter of the thruster body. And each pass, that is to say each passage, of a pure water jet or of an abrasive water jet, is carried out by projection of a high-pressure water jet along the same cutting path extending across the external perimeter of the thruster body.

The cutting path thus described during each pass is a closed loop circuit. And each pass of an abrasive or pure water jet begins from a starting point located on the cutting path and stops just after returning on the starting location. The path followed by the water jet at each pass is therefore longer than the closed loop formed by the cutting path, in other words longer than the circular perimeter of the body.

The starting point of each pass of pure or abrasive high-pressure water jet is therefore different from the starting points of the other water jet passes, whether it is anterior or posterior passes.

After each second cutting operation pass, the method carries out, in a fifth step 240, a detection of the end of cutting of the cover of the body. The step of detecting the end of cutting includes in this example the application of a pulling force on a portion of the thruster body located on one side of the cutting path, and, if said pulled portion is moved relative to the other portion, an indication of the end of cutting in a last step 250, since it reflects the fact that the cut-out has reached the space separating the elastomer skin and the internal thermal protection layer.

The method according to the invention thus provides a solution allowing to cut only the external thermal protection (PTE), the composite structure and the internal thermal protection (PTI) of a thruster body of an aerospace vehicle, without altering the propellant contained inside the thruster.

The invention claimed is:

1. A method for cutting, in a non-through manner, a body of a thruster of an aerospace vehicle, using water jets, the method comprising a plurality of passes of a high-pressure water jet along the same cutting path extending across the external perimeter of the thruster body, the cutting path describing a closed loop circuit, and each water jet passage starting from a starting point located on the cutting path and stopping just after returning on the starting location, wherein the starting point of each high-pressure water jet pass is different from the starting points of the other water jet passes.

2. The non-through cutting method according to claim 1, wherein at least the first high-pressure water jet pass uses an abrasive water jet.

3. The non-through cutting method according to claim 1, wherein at least the last pass of the high-pressure water jet uses a pure water jet.

4. The non-through cutting method according to claim 1, further comprising, at each pass of a water jet, a step of detecting the end of cutting.

5. The non-through cutting method according to claim 4, wherein the step of detecting the end of cutting comprises the application of a pulling force on a portion of the thruster body located on one side of the cutting path, and, if said pulled portion is moved relative to the other portion, comprises an indication of the end of cutting.

6. The non-through cutting method according to claim 1, wherein the thruster body to be cut has the shape of a cylinder closed at both its axial ends by covers curved outwardly, the body comprising a multilayer wall including a stack, from outside to inside, of an external thermal protection layer, of a layer made of composite material and of an internal thermal protection layer, and the convex covers also having an elastomer skin intended to be in contact with the fuel contained in the body and separated from the internal thermal protection layer by a space, and the non-through cutting method comprises a step of centering the cutting path on a convex cover, the cutting being carried out until the space separating the elastomer skin and the internal thermal protection layer is reached.

* * * * *